US008818161B2

(12) United States Patent
Ohno

(10) Patent No.: US 8,818,161 B2
(45) Date of Patent: Aug. 26, 2014

(54) APPARATUS CAPABLE OF EXECUTING AT LEAST REPRODUCING PROCESS ON CONTENT, RECORDING AND REPRODUCING SYSTEM, AND TITLE INFORMATION MANAGING METHOD

(75) Inventor: Katsuya Ohno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1405 days.

(21) Appl. No.: 12/140,231

(22) Filed: Jun. 16, 2008

(65) Prior Publication Data
US 2008/0317435 A1  Dec. 25, 2008

(30) Foreign Application Priority Data

Jun. 25, 2007  (JP) .................................. 2007-166632

(51) Int. Cl.
H04N 5/91 (2006.01)
(52) U.S. Cl.
CPC ...................................... *H01N 9/87* (2013.01)
USPC ........................................................ 386/125
(58) Field of Classification Search
CPC ....... H04N 9/87; G11B 27/034; G11B 27/322
USPC ............................................ 386/95, 125, 248
See application file for complete search history.

(56) References Cited

U.S. PATENT DOCUMENTS

| | | | |
|---|---|---|---|
| 6,822,661 B2 * | 11/2004 | Sai et al. | 715/716 |
| 7,187,947 B1 * | 3/2007 | White et al. | 455/556.1 |
| 7,542,660 B2 * | 6/2009 | Kanegae et al. | 386/248 |
| 8,358,912 B2 * | 1/2013 | Ryu et al. | 386/291 |
| 2002/0109930 A1 | 8/2002 | Saito et al. | |
| 2004/0078812 A1 * | 4/2004 | Calvert | 725/46 |
| 2005/0123268 A1 | 6/2005 | Kawaguchi et al. | |
| 2006/0155754 A1 * | 7/2006 | Lubin et al. | 707/102 |

FOREIGN PATENT DOCUMENTS

| | | |
|---|---|---|
| JP | 2002-73043 | 3/2002 |
| JP | 2003-316367 | 11/2003 |
| JP | 2004-72396 | 3/2004 |
| JP | 2005-109532 | 4/2005 |
| JP | 2005-167818 | 6/2005 |
| JP | 2006-040338 | 2/2006 |
| JP | 2006-140609 | 6/2006 |
| JP | 2006-235742 | 9/2006 |
| JP | 2007-011647 | 1/2007 |
| JP | 2007-074483 | 3/2007 |
| JP | 2007-088760 | 4/2007 |

OTHER PUBLICATIONS

Notice of Reasons for Rejection mailed by the Japan Patent Office on Aug. 2, 2011 in corresponding Japanese app. No. 2007-166632 in 5 pages.
Notice of Reasons for Rejection, mailed on Feb. 14, 2012, in connection with related Japanese patent application No. JP 2007-166632.
Japanese Office Action dated Nov. 26, 2013 in Japanese Application No. 2012-234864, 6 pgs.

* cited by examiner

*Primary Examiner* — Jeffrey Pwu
*Assistant Examiner* — Helai Salehi
(74) *Attorney, Agent, or Firm* — Knobbe, Martens, Olson & Bear, LLP

(57) ABSTRACT

According to one embodiment, there is provided an apparatus capable of executing at least a reproducing process on content. The apparatus includes a title information acquiring unit configured to acquire title information on content subjected at least to the reproducing process for each of content obtained via a network and content obtained from a removable recording medium, and a history holding unit configured to hold the title information acquired by the title information acquiring unit, as a history.

20 Claims, 7 Drawing Sheets

| Title | Genre | Synopsis | Cast and director | Reproduction count | Source |
|---|---|---|---|---|---|
| AAAA | Variety | ... | ... | 1 | Broadcasting wave |
| BBBB | Movie | ... | ... | 2 | Package medium |
| CCCC | Sports | ... | ... | 1 | Network |
| DDDD | Drama | ... | ... | 0 | Broadcasting wave |
| .... | | | | | |

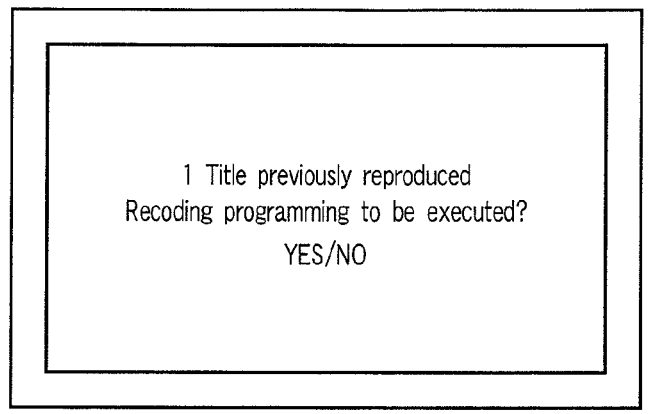
FIG. 9
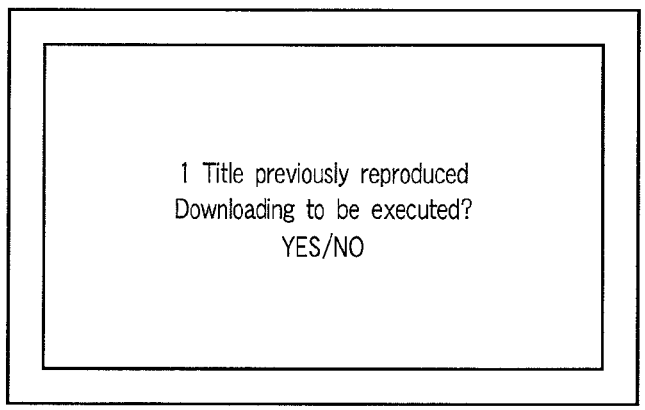
FIG. 10
| | Title |
|---|---|
| ✓ | Title A |
| | Title B |
| | Title C |
| | Title D |
| ✓ | Title E |
| | Title F |
FIG. 11

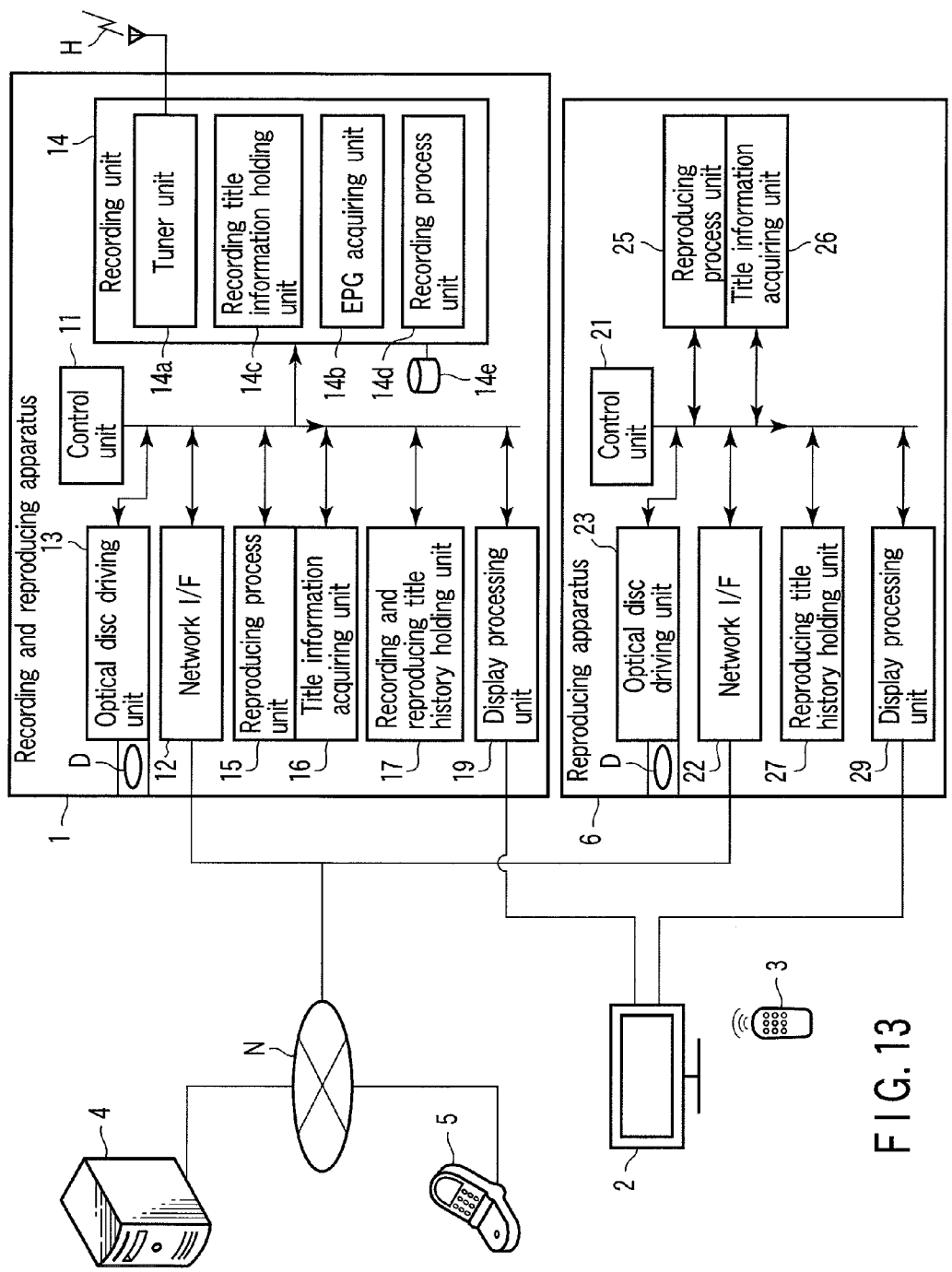
F I G. 13

APPARATUS CAPABLE OF EXECUTING AT LEAST REPRODUCING PROCESS ON CONTENT, RECORDING AND REPRODUCING SYSTEM, AND TITLE INFORMATION MANAGING METHOD

CROSS-REFERENCE TO RELATED APPLICATIONS

This application is based upon and claims the benefit of priority from Japanese Patent Application No. 2007-166632, filed Jun. 25, 2007, the entire contents of which are incorporated herein by reference.

BACKGROUND

1. Field

One embodiment of the invention relates to an apparatus capable of executing at least a reproducing process on content, a recording and reproducing system, and a title information managing method.

2. Description of the Related Art

Generally, recording and reproducing apparatuses capable of executing processes of recording and reproducing contents includes a library function of managing the titles of the contents recorded in a hard disk or the like through broadcasting waves or the like. However, the library function manages only the titles of the recorded contents and cannot manage the titles of contents reproduced from other sources, for example, the titles of contents of digital versatile discs (DVDs) rented at shops or the like.

Various techniques of managing information on contents have been proposed which techniques are different from the management of the titles.

For example, Jpn. Pat. Appln. KOKAI Publication No. 2005-167818 discloses reception of content and reception and storage of public metadata (user information, program recording information, material organization information, reproduction control information, evaluation/statistics information, link information, and historical information). Jpn. Pat. Appln. KOKAI Publication No. 2004-72396 discloses storage of not only EPG data but also data (viewing rate information, recording rate information, and the like) related to the content. Jpn. Pat. Appln. KOKAI Publication No. 2003-316367 discloses storage of historical information on actions such as downloading, streaming reproduction, and reproduction skipping of the content.

As described above, the conventional library function manages only the title of the content recorded through the broadcasting wave or the like. Thus, although the title of content obtained from a single source can be managed, the titles of contents from different sources cannot be managed in an integrated fashion. Consequently, it is impossible to display the titles of various reproduced contents on a display unit, for example, contents reproduced from a removable recording medium (package medium or the like) and contents acquired and reproduced via a network. This applies not only to recording and reproducing apparatuses but also reproducing apparatuses (playback-only apparatuses).

Furthermore, the above-described integrated management cannot be achieved using the techniques described in the above-described three documents.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 9 is an exemplary diagram showing an example of a screen displayed on a display device when recording programming is specified for the same title as that previously reproduced;

FIG. 10 an exemplary diagram showing an example of a screen displayed on the display device when downloading is specified for the same title as that previously reproduced;

FIG. 11 is an exemplary diagram showing an example of a list of preview titles displayed on the display device or the screen of the terminal;

FIG. 13 is an exemplary diagram showing an example of a system that manages the titles of contents from different sources using the recording and reproducing apparatus and the reproducing apparatus.

DETAILED DESCRIPTION

Various embodiments according to the invention will be described hereinafter with reference to the accompanying drawings. In general, according to one embodiment of the invention, there is provided an apparatus capable of executing at least a reproducing process on content. The apparatus includes a title information acquiring unit configured to acquire title information on content subjected at least to the reproducing process for each of content obtained via a network and content obtained from a removable recording medium; and a history holding unit configured to hold the title information acquired by the title information acquiring unit, as a history.

Figures 1, 2:
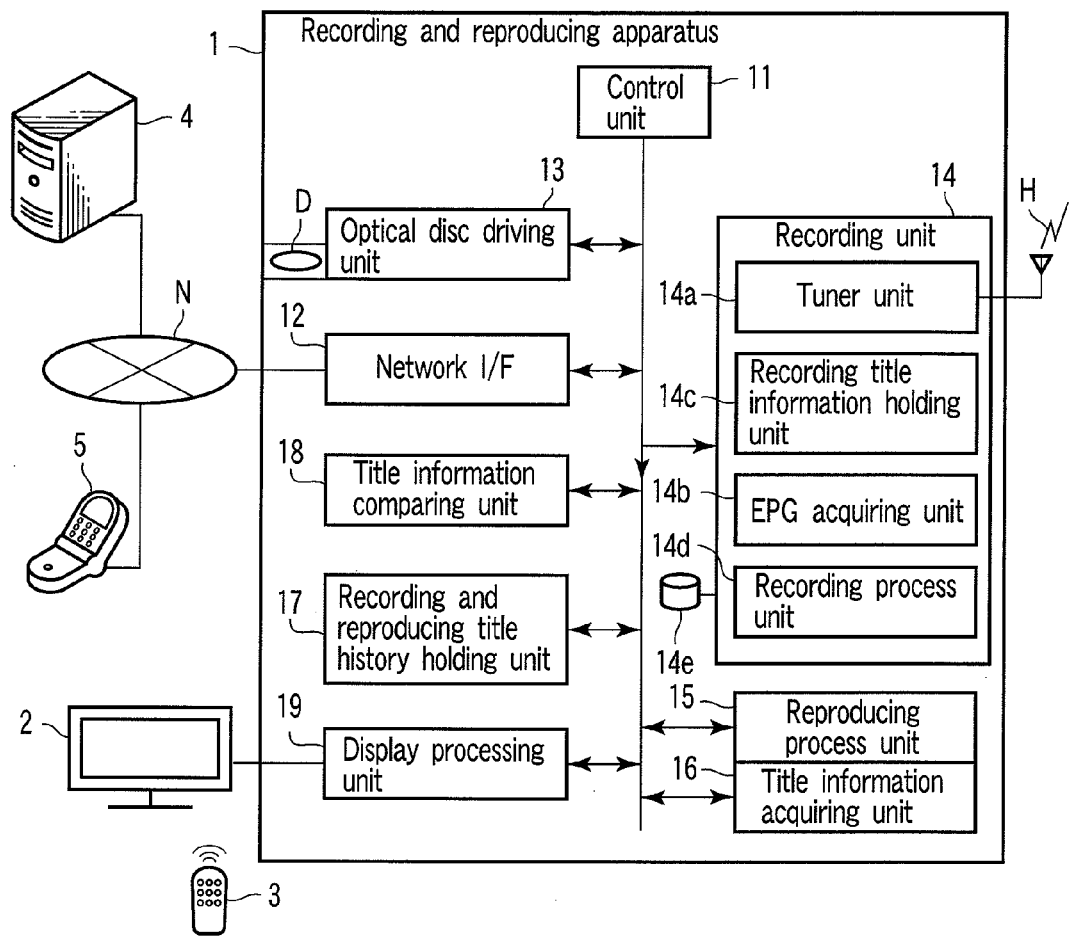
FIG. 1 is an exemplary diagram showing an example of the configuration of a system including a recording and reproducing apparatus according to an embodiment of the invention.
FIG. 2 is an exemplary diagram showing an example of a history held in a recording and reproducing title history holding unit in FIG. 1.

FIG. 1 is an exemplary diagram showing an example of the configuration of a recording and reproducing apparatus according to an embodiment of the invention.

The present system has a recording and reproducing apparatus 1, a display device 2, a remote controller 3, a server 4, and a terminal 5. The recording and reproducing apparatus 1, the server 4, and the terminal 5 can be connected together via a network N.

The recording and reproducing apparatus 1 can execute processes of recording and reproducing various contents from different sources, such as contents obtained through a broadcasting wave H, contents obtained via the network N, and contents obtained from an optical disc D as a removable recording medium (package medium or the like).

The display device 2 displays, on a screen, contents reproduced or output from the recording and reproducing apparatus 1 and various pieces of information related to the contents.

The remote controller 3 is an input device via which the recording and reproducing apparatus 1 or the display device 2 is operated.

The server 4 is an information processing apparatus that can provide various pieces of information such as content and title information on the content, and a different content accompanying the above-described content and title information on the different content, to the recording and reproducing apparatus 1 or the like via the network N.

The recording and reproducing apparatus 1 has a control unit 11, a network interface 12, an optical disc driving unit 13, a reproducing unit 14, a reproducing process unit 15, a title information acquiring unit 16, a recording and reproducing title history holding unit 17, a title information comparing unit 18, and a display processing unit 19. The recording unit 14 has a tuner unit 14*a*, an electronic program guide (EPG) acquiring unit 14*b*, recording title information 14*c*, a recording process unit 14*d*, and a hard disk 14*e*.

The control unit 11 corresponds to a processor that is responsible for the operation of the whole recording and reproducing apparatus 1. The control unit 11 implements various functions by executing predetermined programs.

The network interface 12 is a communication device that executes an interface process between the recording and reproducing apparatus 1 and the network N.

The optical disc driving unit 13 is a device that, for example, drives the optical disc D (for example, DVD) as a recording media that is removable from the recording and reproducing apparatus 1, to read data from the optical disc D.

The recording unit 14 records contents obtained through the broadcasting wave H and contents obtained via the network N. The recording unit 14 has a function of allowing the recording title information holding unit 14*c* to hold title information on content as recording history every time a process of recording the content is executed. The tuner unit 14*a* extracts content such as a broadcasting program from the broadcasting wave H received by an antenna. The EPG acquiring unit 14*b* acquires EPG provided through the broadcasting wave H. The recording title information holding unit 14*c* acquires title information on content to be subjected a recording process by the recording unit 14, from, for example, EPG. The recording process unit 14*d* executes a process of recording content and information on the content. The hard disk 14*e* stores, for example, content subjected to the recording process by the recording process unit 14*d*. The title information may be recorded in the hard disk 14*e*.

The reproducing process unit 15 executes a process of reproducing contents obtained through the broadcasting wave H (real-time reproduction, reproduction after recording), a process of reproducing content obtained via the network N (streaming reproduction, reproduction after downloading), and a process of reproducing content obtained from the optical disc D.

The title information acquiring unit 16 acquires title information on content subjected to at least to the reproducing process, for each of the content obtained through the broadcasting wave H, the content obtained via the network N, and the content obtained from the optical disc D. The title information acquiring unit 16 can acquire not only the title information on the content subjected to the reproducing process but also title information on content subjected to the recording process (the title information held in the recording title information holding unit 14*c*).

For the content obtained through the broadcasting wave H, the title information acquiring unit 16 acquires the title information from, for example, EPG. For the content obtained via the network N, the title information acquiring unit 16 acquires the title information, for example, from the server 4 providing the content, via the network N. For the content obtained from the optical disc D, the title information acquiring unit 16 acquires the title information from the optical disc if the title information is recorded in the optical disc D. On the other hand, if the title information is not recorded in the optical disc D, the title information acquiring unit 16 acquires the title information, for example, from the server 4 via the network N on the basis of the optical disc D or information inherent in the contents.

The title information acquiring unit 16 can acquire the title information on the different content (for example, the different content that can be downloaded via the network N) which accompanies the content subjected to the reproducing process and which can be acquired separately from the content subjected to the reproducing process. Furthermore, the title information acquiring unit 16 can acquire the title information, for example, from the server 4 through the network N when the terminal 5 transmits a predetermined command to the apparatus via the network N.

The recording and reproducing title history holding unit 17 holds the title information acquired by the title information acquiring unit 16, as a history. The recording and reproducing title history holding unit 17 can hold the title information on the content subjected to the reproducing process and the title information on the content subjected to the reproducing process (the title information held in the recording title information holding unit 14*c*), as a history.

When a certain piece of title information is specified by the terminal 5, the remote controller 3, or the like, the title information comparing unit 18 compares this title information with each piece of the title information contained in the history held in the recording and reproducing history holding unit 17 to determine whether or not the search target title information is present in the history.

The display processing unit 19 forms an image that displays content reproduced or output from the recording and reproducing apparatus 1 and various pieces of information accompanying the content, and outputs the image to the display device 2.

If the control unit 11 fails to acquire the title information on the contents to be subjected to the recording process by the recording unit 14, from EPG, the control unit 11 can allow the display device 2 to display a message urging the user to input title information or can acquire the title information via the network N.

Furthermore, in response to a predetermined operation of the remote controller 3 on the recording and reproducing apparatus 1, the control unit 11 can allow the display device 2 to output, through the display processing unit 19, a list of the title information contained in the history held by the recording and reproducing history holding unit 17.

Upon receiving, at the network interface 12, a predetermined command transmitted from the terminal 5 via the network N, the control unit 11 can transmit, for example, the list of the title information contained in the history held in the recording and reproducing history holding unit 17.

Upon receiving, at the network interface 12, the title information or a part of the title information transmitted from the terminal 5 via the network N, the control unit 11 can search the history held in the recording and reproducing history holding unit 17 for this title information and return the result of the search (for example, the presence or absence of the search target title information) to the terminal 5.

Furthermore, when content is downloaded or recording programming is set, the control unit 11 can search the recording and reproducing history holding unit 17 for the title information on the content. If corresponding title information is present in the recording and reproducing history holding unit 17, the control unit 11 can provide a display gathering the user's attention, on the display device 2 (or the terminal 5).

The control unit 11 can also allow the display device 2 (or terminal 5) to display a screen on which the user can specify whether or not to save the title information to the recording and reproducing history holding unit 17 as a history.

The control unit 11 can also allow the display device 2 (or terminal 5) to display a screen on which the user can change (correct, delete, or the like) the history saved in the recording and reproducing history holding unit 17.

Furthermore, when the terminal 5 accesses the recording and reproducing apparatus 1, the control unit 11 executes a predetermined authenticating process (a check of a password or the like) between the recording and reproducing apparatus 1 and the terminal 5. If the authentication succeeds, the control unit 11 permits the recording and reproducing apparatus 1 to provide the information to the terminal 5.

In providing information to the terminal 5, the control unit 11 can execute an encoding process that allows the encoded information to be decoded at the terminal 5 via the authenticating process.

The control unit 11 can also allow the display device to display a message relating to the title information on the different content which accompanies the content subjected to the reproducing process and which can be acquired separately from the content subjected to the reproducing process. Alternatively, the control unit 11 can allow the message to be communicated to the terminal 5 via the network.

The control unit 11 can also allow the display device 2 to display a screen on which the user can specify whether or not to acquire the title information via the network N.

Furthermore, when the terminal 5 transmits a predetermined command to the recording and reproducing apparatus via the network N, the control unit 11 can acquire corresponding title information from the server 4 via the network N and transmit the title information acquired to the terminal 5.

FIG. 2 is an exemplary diagram showing an example of the history held in the recording and reproducing title history holding unit 17.

The individual pieces of title information recorded in the recording and reproducing title history holding unit 17 as a history include the title and the genre, synopsis, cast and director, reproduction count, and source of the title. Thus, besides the basic pieces of information (title, genre, synopsis, cast, and director) on the title, the "reproduction count" and the "source" are held as a history; the "reproduction count" indicates the number of times that the title has been reproduced so far and the "source" indicates from what source the title has been obtained. All or a part of the history can be displayed on the terminal 5 or the display device 2 in response to an instruction from the user.

Figure 3:
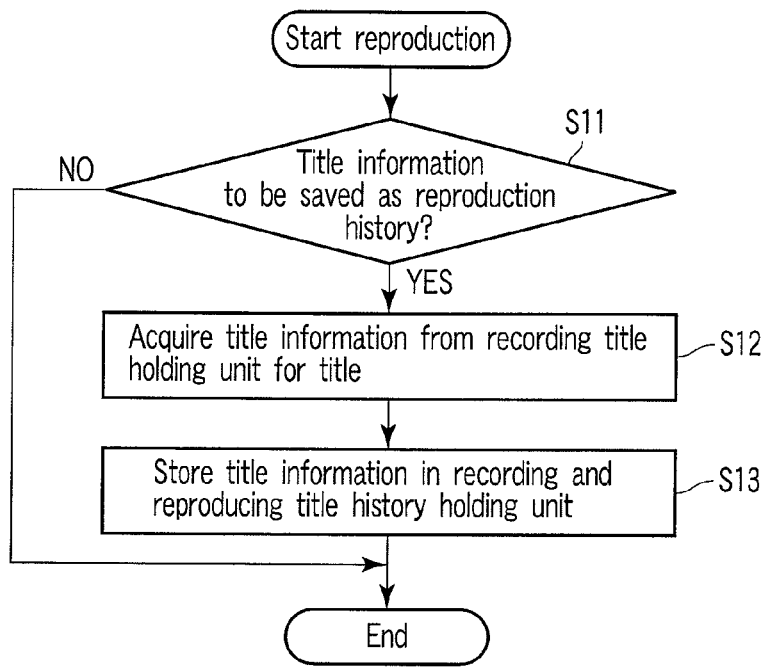
FIG. 3 is an exemplary flowchart showing an operation for saving title information on content obtained through broadcasting waves, as a reproduction history.
Figure 4:
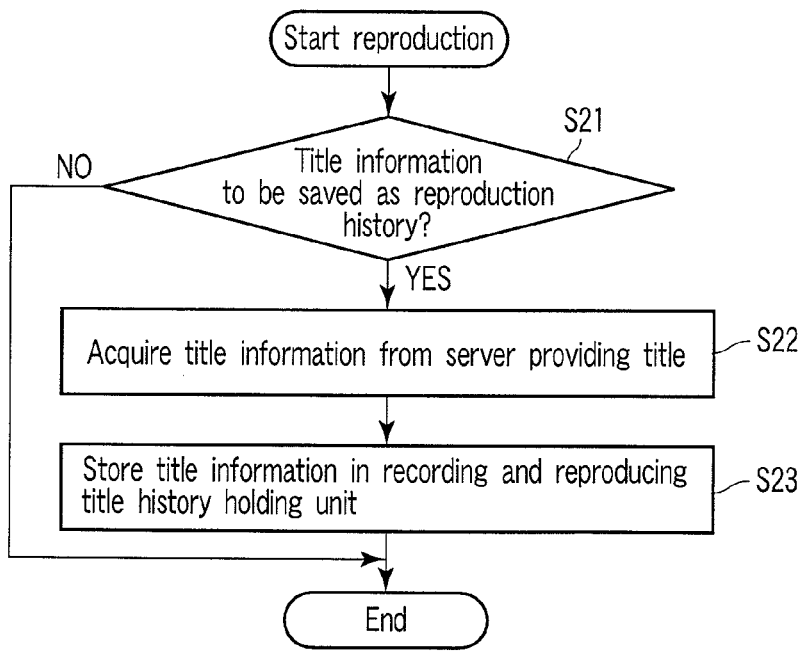
FIG. 4 is an exemplary flowchart showing an operation for saving title information on content obtained by streaming or downloading via a network.
Figure 5:
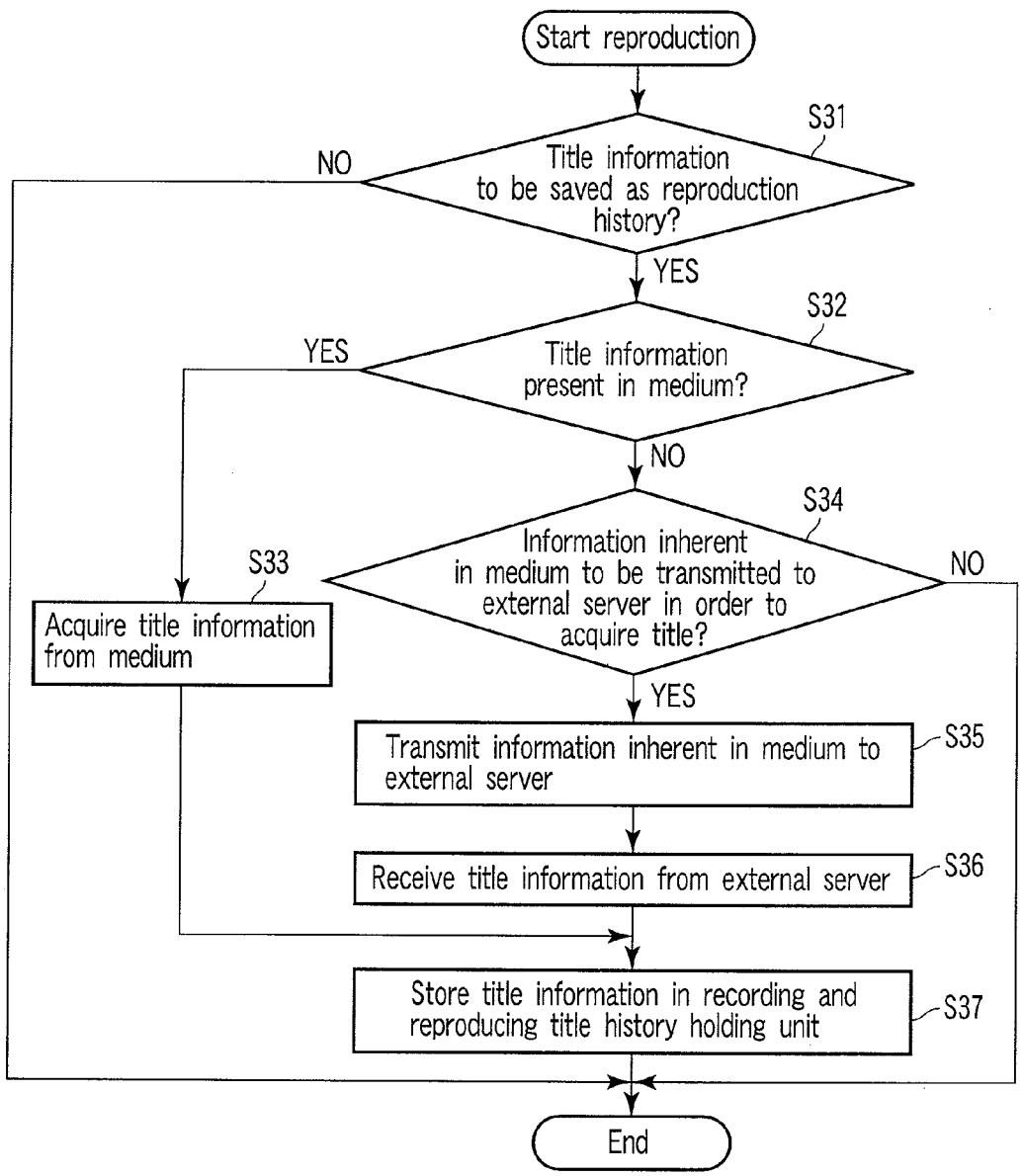
FIG. 5 is an exemplary flowchart showing an operation for saving title information on content obtained from an optical disc that is a removable recording medium, as a reproduction history.

FIGS. 3 to 5 are exemplary flowcharts showing that an operation of saving title information as a reproduction history during a process of reproducing content varies depending on the source of the content.

First, with reference to FIG. 3, description will be given of an operation of saving the title information on the content obtained through the broadcasting wave H, as a reproduction history.

Here, it is assumed that the title information on the content obtained through the broadcasting wave H is already saved in the recording title information holding unit 14c.

To reproduce the content, the control unit 11 determines whether or not to save the title information on the content as a reproduction history (step S11). Here, the user may be urged to specify whether or not to save the title information every time the reproduction process is executed or whether or not to save the title information may be determined in accordance with information preset by the user.

If the title information is not saved, the process is ended. Otherwise, the title information on the content is acquired from the recording title holding unit 14c (step S12).

Finally, the title information acquired is stored in the recording and reproducing title history holding unit 17 as a reproduction history (step S13).

Now, with reference to FIG. 4, description will be given of an operation for saving the title information on the content obtained by streaming or downloading via the network N, as a reproduction history.

Here, it is assumed that the title information on the content is already saved on the server 4.

To reproduce the content, the control unit 11 determines whether or not to save the title information on the content as a reproduction history (step S21). Here, the user may be urged to specify whether or not to save the title information every time the reproduction process is executed or whether or not to save the title information may be determined in accordance with information preset by the user.

If the title information is not saved, the process is ended. Otherwise, corresponding title information is acquired from the server 4 providing the content, via the network N (step S22).

Finally, the title information acquired is stored in the recording and reproducing title history holding unit 17 as a reproduction history (step S23).

In the case of the content obtained by streaming or downloading via the network N, the server 4 providing the content may have the user's viewing history (including the title information). In this case, the title information is not acquired during reproduction, but when the terminal 5 or the like accesses the recording and reproducing apparatus 1 (in order to request browsing of the reproduction history) all of the viewing history may be acquired from the content server.

Now, with reference to FIG. 5, description will be given of an operation for saving the title information on the content obtained from the optical disc D, as a reproduction history.

Here, it is assumed that the title information may be recorded in the optical disc D together with the content or the title information is held on the server 4 providing the content instead of being recorded in the optical disc D together with the content.

To reproduce the content, the control unit 11 determines whether or not to save the title information on the content as a reproduction history (step S31). Here, the user may be urged to specify whether or not to save the title information every time the reproduction process is executed or whether or not to save the title information may be determined in accordance with information preset by the user.

If the title information is not saved, the process is ended. Otherwise, the control unit 11 determines whether or not the title information is present in the optical disc D (step S32).

If the title information is present in the optical disc D, the title information is acquired from the optical disc D (step S33). On the other hand, if the title information is not present in the optical disc D, the control unit 11 determines whether or not to transmit information inherent in the optical disc (or information inherent in the content) to the server 4 in order to acquire the title information (step S34). Here, the user may be urged to specify whether or not to acquire the title information via the network every time the reproduction process is executed or whether or not to acquire the title information via the network may be determined in accordance with information preset by the user.

If the title information is not acquired via the network, the process is ended. On the other hand, if the title information is acquired via the network, the information inherent in the optical disc D (or the information inherent in the content) is transmitted to the server 4 (step S35). The title information is then received from the server 4 (step S36).

Finally, the title information acquired is stored in the recording and reproducing title history holding unit 17 as a reproduction history (step S37).

As described above, the user can specify whether or not to save the title information as a reproduction history. Furthermore, even after the title information is saved as a reproduction history, the user can perform edition or deletion of the reproduction history, addition of a reproduction history, or the like. If the title information cannot be obtained from the content source, it is possible to store, as a reproduction history, the title information acquired by the user operating the remote controller 3 or the terminal 5 to perform a search on the Internet or the title information directly input by the user via the remote controller 3 or the terminal 5.

The recording and reproducing apparatus 1 according to the present embodiment can search the history stored in the recording and reproducing title history holding unit 17 or the title information held in the recording title information holding unit 14c, for the title information transmitted from external equipment such as the terminal 5 via the network N. The recording and reproducing apparatus 1 can then return the presence or absence of the history to the external equipment. Alternatively, the recording and reproducing apparatus can transmit all or a part of the history in accordance with a command transmitted via the network N. In this case, to prevent the information in the history from being unfairly acquired by the external equipment, it is possible to execute an authenticating process between the external equipment and the recording and reproducing apparatus 1. An example of the authenticating process will be described below.

Figure 6:
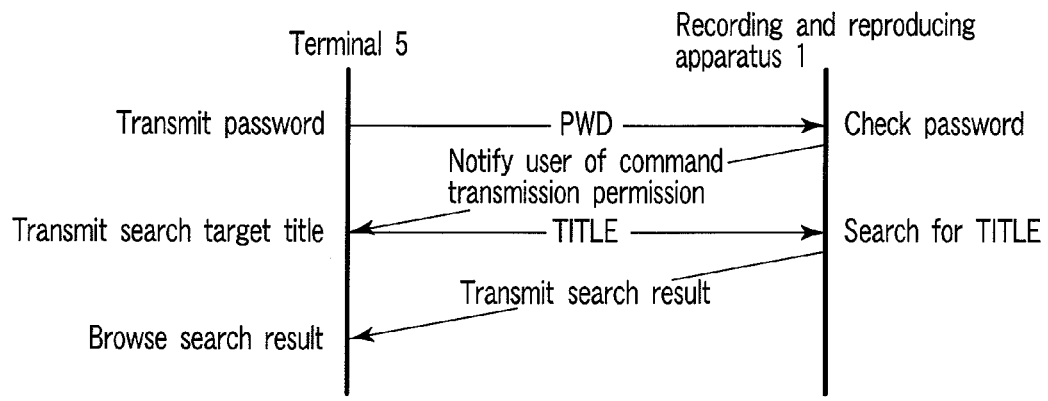
FIG. 6 is an exemplary diagram showing an example of an authenticating process based on a check of a password.

FIG. 6 is an exemplary diagram showing an example of the authenticating process based on a check of a password.

When a password "PWD" is input to the terminal 5, the terminal 5 transmits the password "PWD" to the recording and reproducing apparatus 1 via the network.

Upon receiving the password "PWD", the recording and reproducing apparatus 1 determines whether or not the password "PWD" is appropriate. Upon determining that the password "PWD" is appropriate, the recording and reproducing apparatus 1 transmits a command transmission permission notification to the terminal 5 via the network.

After the terminal 5 receives the command transmission permission notification, when the user inputs a search request for determining whether or not a title "TITLE" is present in the reproduction history, the terminal 5 transmits a command requesting a search for the title "TITLE" to the recording and reproducing apparatus 1 via the network.

Upon receiving the command requesting the a search for the title "TITLE", the recording and reproducing apparatus 1 searches the history stored in the recording and reproducing title history holding unit 17 or the title information held in the recording title information holding unit 14c, for the title "TITLE". Upon obtaining a search result indicating the presence or absence of the title "TITLE", the recording and reproducing apparatus 1 transmits the search result to the terminal 5 via the network.

Upon receiving the search result, the terminal 5 displays the search result on the screen. Thus, the user can browse the search result.

In the above-described authenticating process, information different from the password may be used to protect the history.

In the present embodiment, when downloading the contents or setting recording programming, the recording and reproducing apparatus 1 can search the history saved in the recording and reproducing title history saving unit 17, for the title information to be downloaded or to be programmed for recording. If corresponding title information is present, the recording and reproducing apparatus 1 can display a screen that gathers the user's attention.

Now, with reference to FIGS. 7 and 8, description will be given of an example of information displayed on the screen of the terminal 5 connected to the recording and reproducing apparatus 1 via the network N.

Figure 7:
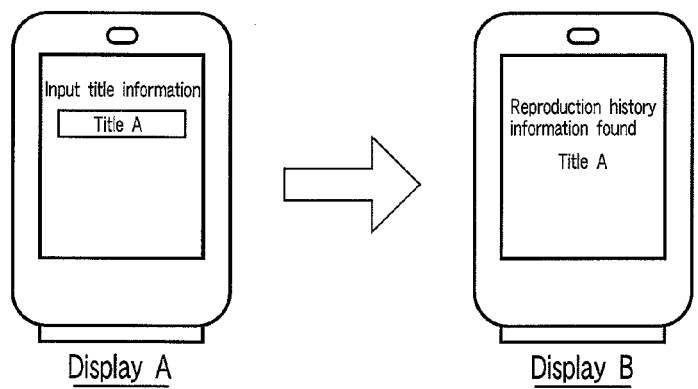
FIG. 7 is an exemplary diagram showing an example of a screen displayed on a terminal in response to a request for a search of a reproduction history.

FIG. 7 is an exemplary diagram showing an example of a screen displayed on the terminal 5 in response to a request for a search of the reproduction history.

As shown in a display A, when a screen urging the user to input title information is displayed on the terminal 5, for example, a "title A" is input and transmitted to the recording and reproducing apparatus 1 through the network N. The recording and reproducing apparatus 1 searches for the "title A". Here, it is assumed that the "title A" is present in the reproduction history.

When a search result is returned to the terminal 5, the terminal 5 displays a screen showing, for example, the found "title A" together with a message "Reproduction history information found" as shown in a display B.

Figure 8:
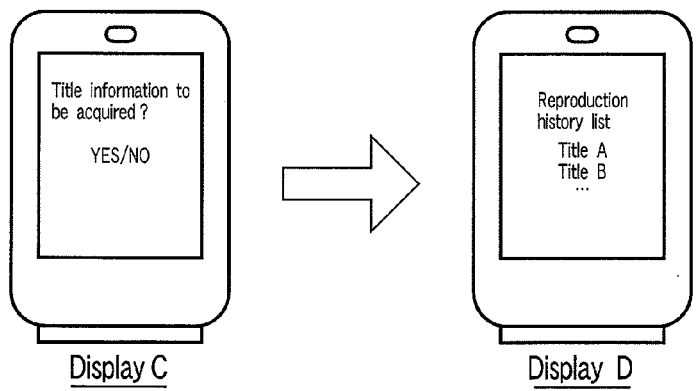
FIG. 8 is an exemplary diagram showing an example of a screen displayed on the terminal in response to a request for browsing of the reproduction history.

FIG. 8 is an exemplary diagram showing an example of a screen displayed on the terminal 5 in response to a request for browsing of the reproduction history.

As shown in a display C, when a screen urging the user to specify whether or not to acquire the title information is displayed on the terminal 5, for example, "YES" is specified and transmitted to the recording and reproducing apparatus 1 through the network N. The recording and reproducing apparatus 1 then reads the reproduction history and returns the title and the like contained in the reproduction history to the terminal 5.

When a search result is returned to the terminal 5, for example, a screen showing "Title A", "Title B", . . . is displayed on the terminal 5 as a "reproduction history list" as shown in a display D.

Now, with reference to FIGS. 9 and 10, description will be given of information displayed on the screen of the display device 2 connected to the recording and reproducing apparatus 1.

FIG. 9 is an exemplary diagram showing an example of a screen displayed on the display device 2 when recording programming of the same title as that previously reproduced is specified.

For example, when recording of a television program or the like is programmed, if corresponding title is found as a result of a search of the reproduction history held in the recording and reproducing title history holding unit 17 for EPG title information on the recording target program, then for example, a screen showing a selection item "YES/NO" is displayed on the display device 2 together with messages "Title previously reproduced" and "Recording programming to be executed?" as shown in FIG. 9.

FIG. 10 is an exemplary diagram showing an example of a screen displayed on the display device 2 when downloading of the same title as that previously reproduced is specified.

For example, also when downloading is executed to view a download content, if corresponding title is found as a result of a search of the recording and reproducing title history for title information on the downloading target, then for example, a screen showing a selection item "YES/NO" is displayed on the display device 2 together with messages "Title previously reproduced" and "Downloading to be executed?" as shown in FIG. 10.

Furthermore, content which is downloaded from the server specified in the information contained in a certain content and which is different from the certain content may include previews of movies. For the content including the previews, contents that the user desires to view can be listed by acquiring the titles of the previews. In this case, for example, as shown in FIG. 11, a list showing preview titles is displayed on the display device 2 or the terminal 5.

The recording and reproducing history holding unit 17 manages the broadcasting date, release date, rental start date, downloading start date, broadcasting time, and the like of content checked in such a list as described above together with the title of the content. Thus, in the case of the broadcasting wave, the user can be urged to view the content by automatically executing recording programming or transmitting an appropriate message to the terminal 5 by mail on the broadcasting day or the day preceding the broadcasting day.

In the description of the present embodiment, the recording and reproducing title information holding unit 17 manages the title information on the content recorded in the hard disk 14e or the like in the recording unit 14 and the title information on the content previously reproduced from the removable recording medium such as DVD. However, the embodiment can be varied such that the recording and reproducing title information holding unit 17 manages only the title information on the content currently recorded in the hard disk 14e or the like in the recording unit 14

(Title Management by the Reproducing Apparatus)

In the above-described example, the recording and reproducing apparatus 1 manages the titles of the contents from the different sources in an integrated fashion. However, instead, a reproducing apparatus (playback-only apparatus) that executes the reproducing process on contents can manage the titles of the contents from the different sources in an integrated fashion. An example is shown below.

Figure 12:
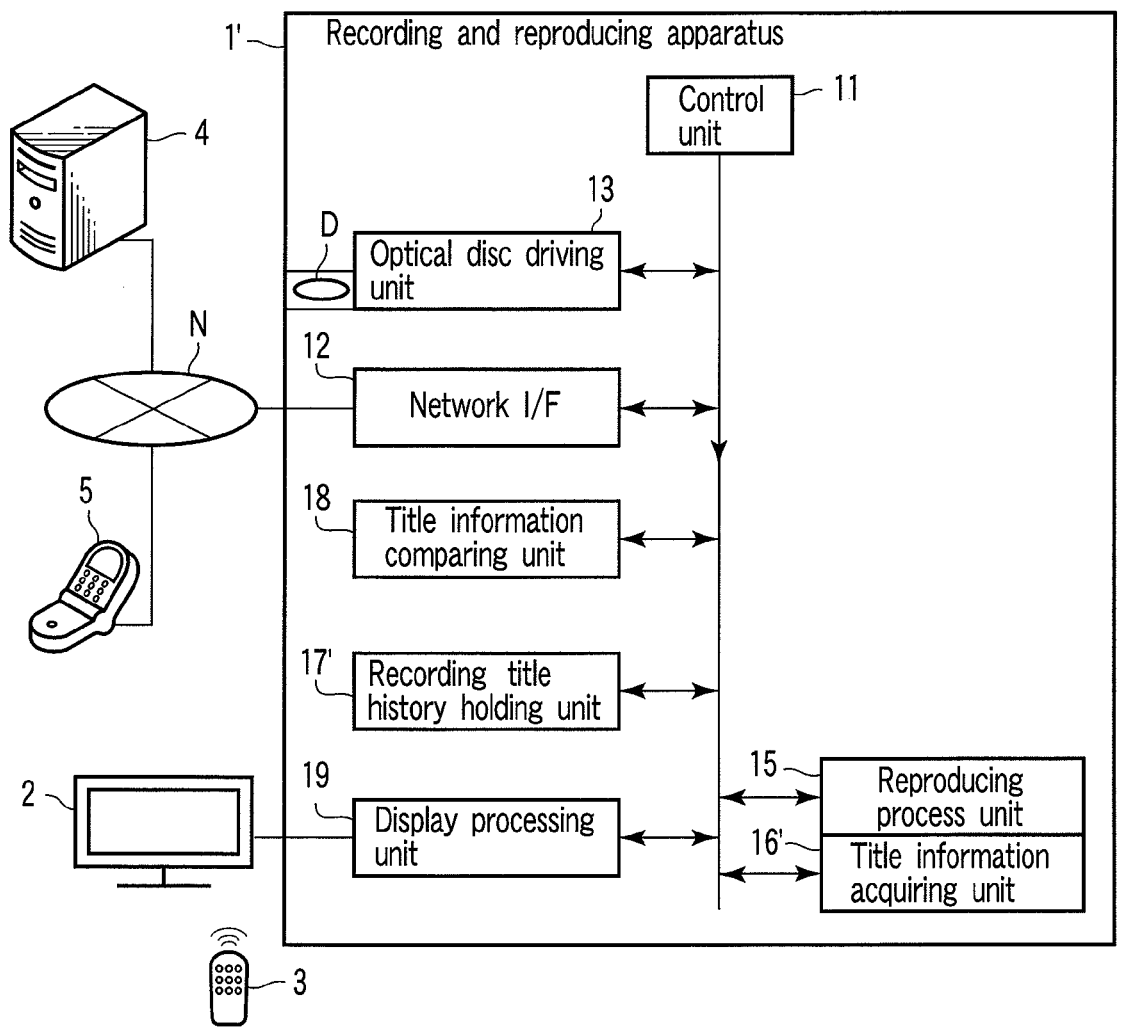
FIG. 12 is an exemplary diagram of an example of a system that manages the titles of contents from different sources using a reproducing apparatus.

FIG. 12 is an exemplary diagram showing an example of a system that manages the titles of the contents from the different sources using the reproducing apparatus. Components of the reproducing apparatus which are the same as the corresponding components in FIG. 1 are denoted by the same reference numerals and will not be specifically described. Differences from the apparatus in FIG. 1 will be mainly described.

The reproducing apparatus 1' has a title information acquiring unit 16' (similar to the above-described title information acquiring unit 16) that acquires title information on the content subjected to the reproducing process by the reproducing process unit 15 for each of the content (streaming contents) obtained via the network N and the content obtained from the optical disc D, which is a removable recording medium, and a reproducing title history holding unit 17' (similar to the above-described recording and reproducing title history holding unit 17) that holds the title information acquired by the title information acquiring unit 16' as a history.

For the content (streaming content) obtained via the network N, the title information acquiring unit 16' acquires the title information, for example, from the server 4 providing the content, via the network N. For the content obtained from the optical disc D, the title information acquiring unit 16' acquires the title information from the optical disc if the title information is recorded in the optical disc D, or for example, from the server 4 via the network N on the basis of the optical disc D or information inherent in the content if the title information is not recorded in the optical disc D.

(Title Management by the Recording and Reproducing Apparatus and the Reproducing Apparatus)

In the above-described example, the titles of the contents from the different sources are managed using the recording and reproducing apparatus or the reproducing apparatus.

FIG. 13 is an exemplary diagram showing an example of a system that manages the titles of the contents from the different sources using the recording and reproducing apparatus and the reproducing apparatus. Components of the recording and reproducing apparatus and reproducing apparatus which are the same as the corresponding components in FIG. 1 are denoted by the same reference numerals and will not be specifically described. Differences from the apparatus in FIG. 1 will be mainly described.

The present system includes the reproducing apparatus 6 in addition to the recording and reproducing apparatus 1, the display device 2, the server 4, and the terminal 5.

The reproducing apparatus 6 has functions similar to those of the reproducing apparatus 1', shown in FIG. 12. The reproducing apparatus 6 has a title information acquiring unit 26 that acquires title information on the content subjected to the reproducing process by a reproducing process unit 25 for each of the content (streaming content) obtained via the network N and the content obtained from the optical disc D, which is a removable recording medium, and a reproducing title history holding unit 27 that holds the title information acquired by the title information acquiring unit 26 as a history.

The recording and reproducing apparatus 1 includes the same components as those shown in FIG. 1.

For example, if the terminal 5 as external equipment transmits a predetermined command to the recording and reproducing apparatus 11 via the network N or a predetermined operation is performed on the recording and reproducing apparatus 1 through the remote controller 3, the control unit 11 of the recording and reproducing apparatus 1 can transmit, to the display device 2, the title information contained in the history held in the recording and reproducing title history holding unit 17 and the title information contained in the history held in the reproducing title history holding unit 27.

Specifically, the control unit 11 of the recoding and reproducing apparatus 1 acquires the title information contained in the history held in the recording and reproducing title history holding unit 17 in the recording and reproducing apparatus 1. The control unit 11 also acquires the title information contained in the history held in the reproducing title history holding unit 27 of the reproducing apparatus 6 via the network. When a list of the individual pieces of title information acquired is formed, the information from the recording and reproducing apparatus 1 and the information from the reproducing apparatus 6 may be displayed in separate lists or may both be displayed in one list.

Thus, the embodiments make it possible to check all the contents from the different sources to be checked via external equipment such as a cellular phone, the contents having previously been recorded in or reproduced from the recording and reproducing apparatus or the reproducing apparatus. This makes it possible to prevent the user from mistakenly renting or purchasing contents already viewed by the user. Furthermore, by transmitting the title information contained in the reproduction history or the recording history from the recording and reproducing apparatus or the terminal to the predetermined server, it is possible to load contents and related information agreeable to the user's taste, from the server into the recording and reproducing apparatus.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An apparatus configured to execute a reproducing process of a content, the apparatus comprising:
   a title information acquiring module configured to acquire title information of the content that is to be subjected to the reproducing process from a source of the content, before the content is reproduced, wherein the content is received from at least two sources selected from the group consisting of a broadcasting wave, a network, and a removable recording medium;
   a history holding module configured to hold the title information acquired by the title information acquiring module as part of a history; and
   a control module configured to determine, when a content is to be acquired, whether or not the content to be acquired has already been reproduced, based on the history held by the history holding module, and to give notice of a determination result if the determination result indicates that the content to be acquired has already been reproduced.

2. The apparatus of claim 1, wherein for the content received from the network, the title information acquiring module is configured to acquire title information via a server providing the content.

3. The apparatus of claim 1, wherein for the content retrieved from the removable recording medium, the title information acquiring module is configured to acquire title information from the recording medium if the title information is recorded in the recording medium.

4. The apparatus of claim 1, wherein for the content retrieved from the removable recording medium, the title information acquiring module is configured to acquire title information from a predetermined server via a network on the basis of information inherent in the content if the title information is not recorded in the recording medium.

5. The apparatus of claim 1, wherein:
   the apparatus is capable of executing a recording process on the content received from broadcast signals.

6. The apparatus of claim 1, further comprising a control module configured to transmit a list of the title information contained in the history held in the history holding module to an external device in response to a predetermined command transmitted from the external device via the network.

7. The apparatus of claim 1, further comprising a control module configured to search the history using title information or a part of the title information transmitted from an external device via the network, and to return a search result to the external device.

8. The apparatus of claim 1, further comprising a control module configured to cause a display of a screen which allows a user to specify whether or not to save title information as part of a history.

9. The apparatus of claim 1, further comprising a control module configured to cause a display of a screen which allows a user to modify the history.

10. The apparatus of claim 1, wherein:
    the title information acquiring module is configured to acquire a second title information of a second content related to a first content, the second content retrieved separately from the first content, and
    the history holding module is further configured to hold the title information of the second content.

11. The apparatus of claim 1, further comprising a control module configured to cause a display of a screen which allows a user to specify whether or not to acquire title information via a network.

12. The apparatus of claim 1, further comprising a control module configured to acquire title information from a predetermined server via a network and transmit the acquired title information to an external device when the external device transmits a predetermined command to the apparatus via a network.

13. The apparatus of claim 1, wherein the acquisition of the content comprises downloading of the content.

14. The apparatus of claim 5, wherein for the content received from the broadcast signals, the title information acquiring module is configured to acquire title information from an electronic program guide.

15. The apparatus of claim 5, further comprising a control module configured to search, when the content is either downloaded or programmed to be recorded, the history for title information on the content and to provide an indication to a user if the title information is present in the history.

16. The apparatus of claim 5, wherein the history holding module is configured to hold title information of the content that has been subjected to the recording process in addition to title information of the content that has been subjected to the reproducing process.

17. The apparatus of claim 6, further comprising a control module configured to execute a predetermined authenticating process between the apparatus and the external device, and to permit the apparatus to provide information to the external device if the authentication succeeds.

18. The apparatus of claim 10, further comprising a control module configured to cause a display of a message related to the title information of the second content or to notify a user of the title information via a network.

19. A title information managing method applied to an apparatus configured to execute a reproducing process of a content using a processor, the method comprising:
    acquiring title information of the content to be subjected to the reproducing process from a source of the content, before the content is reproduced, wherein the content is received from at least two sources selected from the group consisting of a broadcasting wave, a network, and a removable recording medium;

holding the acquired title information as part of a history; and determining, when a content is to be acquired, whether or not the content to be acquired has already been reproduced, based on the held history, and giving notice of a determination result if the determination result indicates that the content to be acquired has already been reproduced.

20. The title information managing method of claim 19, wherein the acquisition of the content comprises downloading of the content.

* * * * *